United States Patent [19]
Burroughs

[11] 3,880,591
[45] Apr. 29, 1975

[54] MOUTHPIECE FOR BREATH TESTING DEVICES

[75] Inventor: James E. Burroughs, Mount Prospect, Ill.

[73] Assignee: Borg-Warner Corporation, Chicago, Ill.

[22] Filed: Jan. 2, 1974

[21] Appl. No.: 430,286

[52] U.S. Cl. .................. 23/259; 23/292; 128/2 C
[51] Int. Cl. ............................................. B01l 11/00
[58] Field of Search .......... 23/232 R, 254 R, 254 E, 23/259, 292; 55/462, 465, DIG. 40; 128/2 C, 2.08, 195, 201, 146.5, 208; 84/397–399, 453

[56] References Cited
UNITED STATES PATENTS

| | | | |
|---|---|---|---|
| 700,384 | 5/1902 | Statler | 55/462 |
| 969,170 | 9/1910 | Linstrom | 55/462 X |
| 1,671,010 | 5/1928 | Braecklein | 128/195 |
| 2,371,965 | 3/1945 | Lehmberg | 128/146.4 |
| 3,522,009 | 9/1970 | Borkenstein | 23/232 R |
| 3,622,278 | 11/1971 | Elzinga | 23/232 R |

FOREIGN PATENTS OR APPLICATIONS
4,542  11/1884  United Kingdom ................... 84/397

*Primary Examiner*—Morris O. Wolk
*Assistant Examiner*—Timothy W. Hagan
*Attorney, Agent, or Firm*—James J. Jennings, Jr.

[57] ABSTRACT

A mouthpiece comprises a breath-receiving cup member mounted on a hollow stem member which provides an outlet of the mouthpiece and which is adapted for connection to the inlet of a breath testing device. The stem member has an inlet portion extending inwardly of the cup member and having a closed end directly opposed to the mouth of the subject to be tested when the mouthpiece is in use. Adjacent to the closed end are apertures communicating with the outlet by way of a passage formed in the stem member. The cup member and the inlet portion of the stem member are so dimensioned that the closed end, and thus the apertures, are spaced from both the mouth of the subject and surrounding portions of the cup member.

16 Claims, 6 Drawing Figures

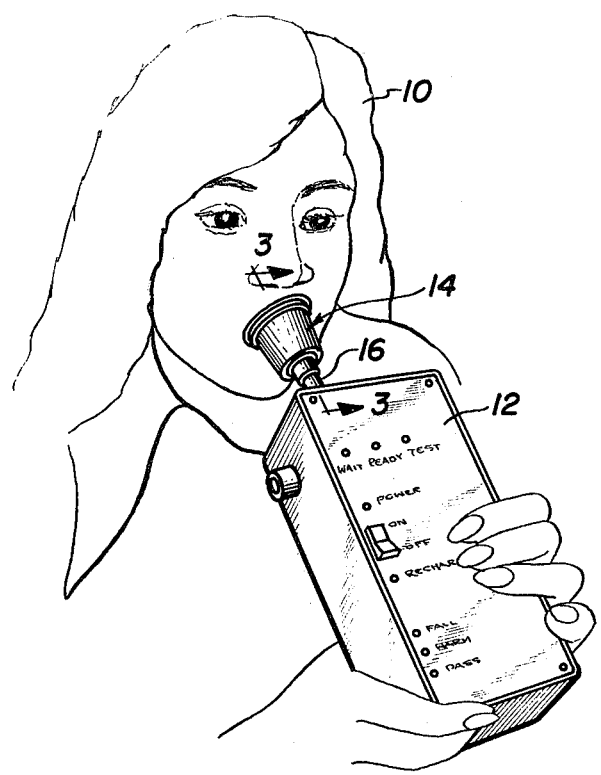
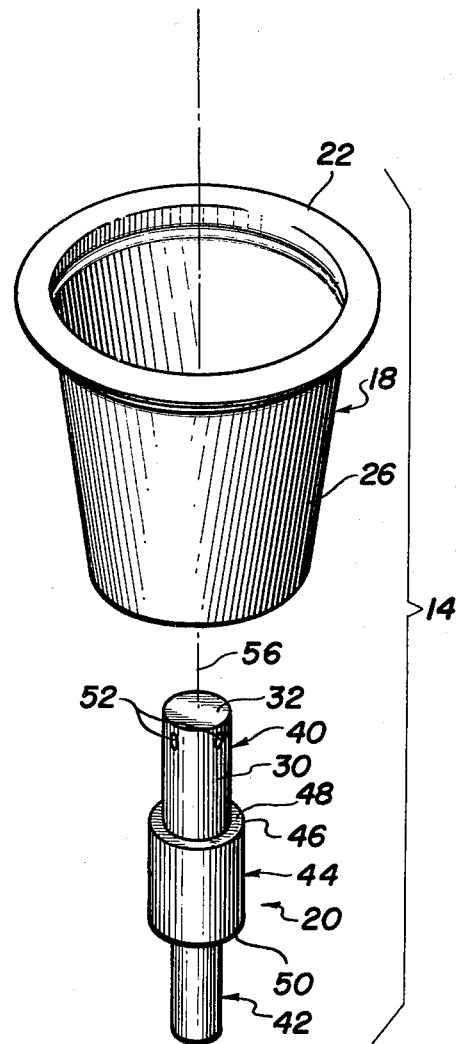
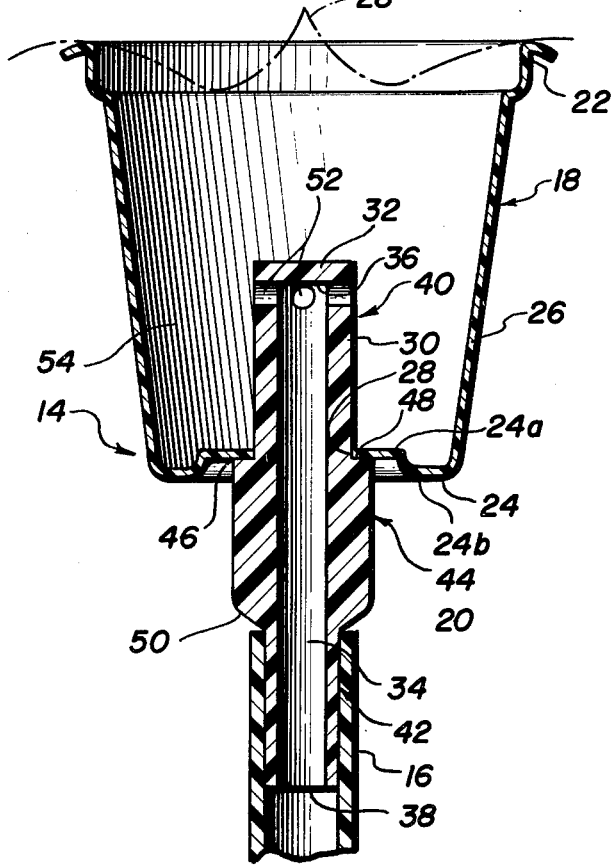
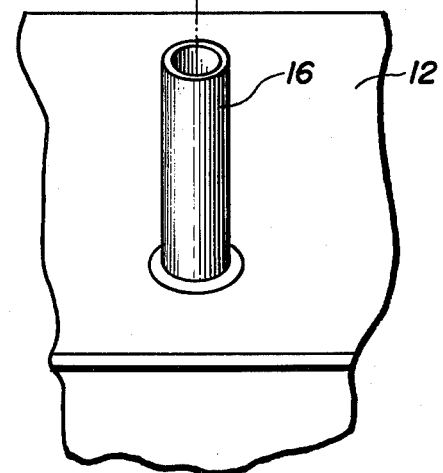

MOUTHPIECE FOR BREATH TESTING DEVICES

BACKGROUND OF THE INVENTION

The present invention relates generally to breath testing devices, and more particularly, to a mouthpiece for a breath testing device.

The term "breath testing device," as it is used in this specification, refers to any one of the wide variety of devices, instruments and systems which are constructed to receive breath expelled by a subject individual and to provide useful information derived from a sample of such breath or from the act of expiring or exhaling. Some of these devices measure or analyze the pulmonary function to assist in detecting the presence of certain abnormal conditions such as emphysema, for example, while others are used to analyze the composition of the breath sample or to detect the presence or measure the concentration of certain substances in the expelled breath.

Of growing importance are various devices of the latter type which determine the concentration of ethyl alcohol in the breath, or which detect a predetermined minimum concentration of alcohol, and are therefore useful in identifying the inebriate. One example of such a device or system is disclosed in U.S. Pat. No. 3,764,270, issued Oct. 9, 1973 to D. W. Collier et al. and assigned to the assignee of the present invention.

Breath testing devices must necessarily be provided with an inlet by means of which breath expelled by the subject is introduced to the device to be directed to operative or sensitive elements. However, if the inlet consists of an open, direct passage and the expelled breath is introduced to the passage directly from the mouth of the subject, substantial amounts of saliva may be expectorated or carried in droplets by the expelled breath, sometimes together with oral debris such as uningested food particles, shreds of tobacco and the like, to enter the device and ultimately to be deposited on interior surfaces thereof. The operative or sensitive elements of many such devices are adversely affected by moisture and may provide results ranging from unreliable to severely erratic in the presence of substantial or widely varying amounts of moisture. Some of the more sensitive elements may even be rendered inoperative or permanently damaged by direct contact with liquid or solid foreign substances.

In any case, use under such conditions will lead to fouling of the device and the consequent need for frequent disassembly and cleaning or replacement of the fouled elements. The problem is aggravated in the case of alcohol detectors or analyzers, since accuracy requires continuous expulsion of breath for a prolonged period of time, for example, four seconds or longer, in order to obtain a sample of alveolar or so-called deep-lung breath.

Accordingly, many breath testing devices are provided with internal arrangements, or with mouthpieces, breathing masks or the like, which make use of such expedients as baffles, tortuous passages or elaborate trap systems. Such means, however, are usually quite intricate and thus expensive to manufacture, and since they themselves are subject to fouling, they must be disposed of or cleaned or sterilized after use. Further, such means frequently restrict or impede the passage of the expelled breath, creating back pressures which may require undue effort on the part of the subject or which may adversely affect the test results.

Some prior mouthpieces or inlets are formed of materials which tend to cause excessive condensation of the vapors present in expelled breath. Many breath testing devices make use of normal breath as a reference gas or calibration standard, i.e., breath or a similar gas containing normal amounts of vapor, and deviations from this standard may provide unreliable results.

In addition, some prior mouthpieces are formed to be received in the oral cavity and/or engaged by the lips of the subject during use. This is frequently distasteful to the subject and almost invariably leads to the introduction of excessive amounts of saliva.

SUMMARY OF THE INVENTION

The mouthpiece according to the present invention includes an elongated hollow element which supports a receiver element into which the subject expels breath. The hollow element has a closed end opposed to the lips of the subject and spaced therefrom by the receiver element. An open end of the hollow element provides an outlet which may be placed in communication with the inlet of a breath testing device. At least one aperture is provided in the hollow element near or adjacent to the closed end so that, in use, breath expelled by the subject enters the receiver element, alters direction to enter the hollow element by way of the aperture, and exits from the outlet. As the breath alters direction, saliva and debris, if any, are removed. A trap is preferably formed beyond the aperture to receive the superfluous matter.

A rim portion of the receiver element is formed to engage the face of the subject and surround his lips, an arrangement which most subjects find comfortable as well as unobjectionable on sanitary grounds, as compared to mouthpieces which must be received in the oral cavity.

The structure of the mouthpiece is extremely simple, affording ease of manufacture, and it may readily be formed of inexpensive materials so that the entire mouthpiece, or the receiver element thereof, may be disposed of after each use. The materials of the mouthpiece may also be selected from those which are suitable for sterilization and which do not cause excessive condensation of breath vapors.

THE DRAWINGS

In the drawings:

FIG. 1 is a perspective view of a mouthpiece comprising a preferred embodiment of the invention connected to a breath testing device in position for use by a subject to be tested;

FIG. 2 is a greatly enlarged, exploded perspective view of the mouthpiece of FIG. 1 and a portion of the breath testing device;

FIG. 3 is a further enlarged, sectional view of the mouthpiece of FIGS. 1 and 2 and a portion of the breath testing device, taken along the line 3—3 of FIG. 1;

THE PREFERRED EMBODIMENTS

Figure 4:
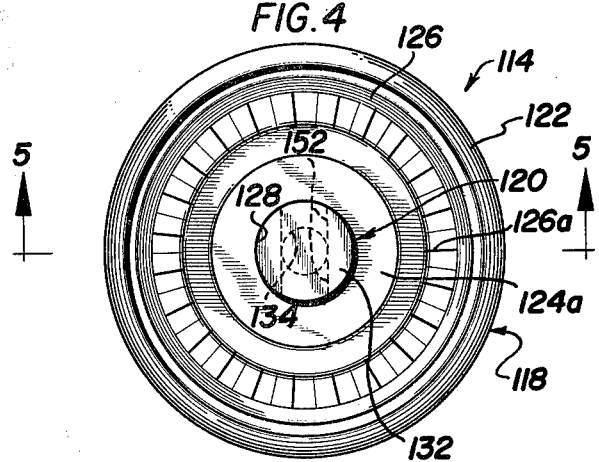
FIG. 4 is a plan view of a mouthpiece comprising an alternative preferred embodiment of the invention.

Referring to FIG. 1, a subject 10, whose breath is to be tested, is shown holding a breath testing device 12 in the testing position. A mouthpiece 14 is engaged with the face of the subject and surrounding the lips thereof. Mouthpiece 14 is connected with an inlet 16 of the testing device. Although, for purposes of illustration, testing device 12 is represented as an inebriate breath detector of the simple "pass-fail" type, mouthpiece 14 is not limited to use with such a device and may be used in connection with any of the breath testing devices mentioned hereinabove.

With reference to FIGS. 2 and 3, mouthpiece 14 comprises an assembly of two members, namely a cup member or receiver member 18 and a stem member 20. Receiver member 18 and stem member 20 may be packaged separately to be assembled and fitted to the testing device by a test supervisor or operator or by the subject himself. Alternatively, they may be provided in a single sterile package. In either case, stem member 20 may be left in place for a number of tests if desired, receiver member 18 preferably being replaced, cleaned or sterilized after each test.

For ease of manufacture, members 18 and 20 are preferably formed separately and may consist of different materials. However, it will be apparent that the mouthpiece may be formed in one piece from a single material without departing from the purview of the invention.

While members 18 and 20 may be made from virtually any material, synthetic resins are preferred for low cost and east of manufacture. Polyethylene and polypropylene are especially preferred since the thermal conductivities of these substances are such that they obviate undue condensation of breath vapors under normal conditions.

Receiver member 18 consists of a wall portion and an annular rim portion 22, the wall portion comprising an annular base wall 24 and a frusto-conical lateral wall 26 extending from the base wall and terminating in the rim portion. The configuration of the rim portion, as shown in section in FIG. 3, is preferably such that the rigidity of lateral wall 26 will be assisted. However, a simple bead or curl may be substituted. The rim portion is also formed to surround the lips of the subject (represented in profile in FIG. 3 by an interrupted curved line 28) in engagement with the face of the subject.

Base wall 24 has an inner surface 24a and an outer surface 24b and defines a round opening 28 centrally of the base wall, all as illustrated in FIG. 3. Receiver member 18 is not restricted to the configuration shown in the drawings but may take any one of a number of forms. For example, it may approach a more nearly conical form, the base wall being omitted and the lateral wall tapering directly from the rim portion to opening 28.

Stem member 20 is an elongated hollow element comprising a tubular wall 30 of varying thickness, as will be explained with particularity hereinafter, and an end wall 32, to define a passage 34 having a blind end 36 and an open end 38, all as illustrated in FIG. 3.

Stem member 20 includes a cylindrical first or inlet end portion 40 terminating in a closed end provided by end wall 32, a cylindrical second or outlet end portion 42 terminating in the open end 38 to provide an outlet of the mouthpiece, and a central portion 44 comprising a cylindrical or annular enlargement provided on tubular wall 30 outwardly thereof and spaced from end wall 32, thereby providing a shoulder 46 which includes an annular surface 48 extending radially outwardly of upper end portion 40.

Opening 28 of receiver member 18 is complementary to or somewhat smaller in cross section than inlet end portion 40, whereby the end portion 40 may be inserted into receiver element 18 by way of opening 28 during assembly, with base wall 24 surrounding end portion 40 in firm engagement therewith. Annular surface 48 provides a stop engageable with outer surface 24b of base wall 24 and assists in supporting the base wall.

Outlet end portion 42 of stem member 20 is adapted for connection to inlet 16 of breath testing device 12. This may be accomplished, as shown in the drawings, by making the outer surface of end portion 42 complementary to the inner surface of inlet 16, whereby end portion 42 may be inserted in the inlet and retained there in a simple friction fit, central portion 44 providing a stop 50 which engages inlet 16 to limit the depth of insertion. However, it will be apparent that any suitable connection means may be used; for example, interengageable threaded means provided on end portion 42 and inlet 16. Further, the outer surface of outlet end portion 42 may be made to taper toward open end 38 so that mouthpiece 14 may be used with breath testing devices having inlets of various sizes.

A plurality of apertures 52 are provided in inlet end portion 40 near or adjacent to the closed end thereof; that is, adjacent to end wall 32. The apertures communicate with passage 34 and thus with open end 38 thereof to provide an inlet of stem member 20. Preferably the sum of the cross sectional areas of apertures 52 is at least equal to the cross sectional area of passage 34. In the embodiment of FIGS. 1 to 3, the apertures are four in number, spaced at 90° intervals about end portion 40.

Inner surface 24a of base wall 24, the inner surface of lateral wall 26 and that part of the outer surface of inlet end portion 40 between the apertures and the base wall cooperate to define an annular trap or reservoir 54, the purpose of which will be made clear hereinafter.

It is important to note, referring especially to FIG. 3, that inlet end portion 40 of stem member 20 and lateral wall 26 of receiver member 18 are so dimensioned that apertures 52 are spaced from rim portion 22 a distance such that engagement of end portion 40 by the lips or teeth of the subject is prevented or discouraged, whereby to maintain apertures 52 unobstructed by the subject's oral structures or by the expectoration of saliva directly into the apertures. End portion 40 is also so dimensioned and apertures 52 so positioned relative thereto that the apertures are spaced from inner surface 24a of base wall 24 to establish the depth of trap 54.

Referring specifically to FIG. 2, receiver member 18 and stem member 20 are formed about a common longitudinal axis 56 which is also the longitudinal axis of inlet 16 of the breath testing device. As shown, mouthpiece 14 is symmetrical about axis 56, and its various elements have been described as "annular," "tubular," "round," "cylindrical" and "frusto-conical." These configurations are not essential to the invention in its broader aspects and any number of cross sectional shapes may be substituted. Similarly, it is not necessary that mouthpiece 14 be formed about a linear axis. Stem member 20, for example, may be curved or bent longitudinally for the comfort or convenience of the subject in using certain types of breath testing devices.

Figure 5:
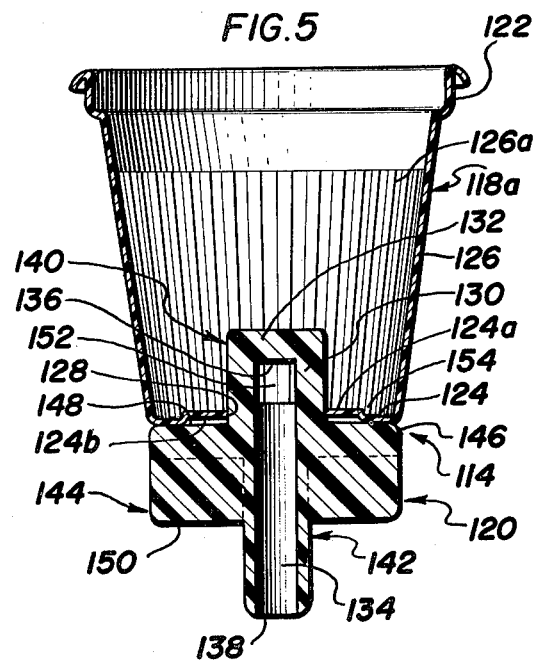
FIG. 5 is a sectional view of the mouthpiece of FIG. 4, taken along the line 5—5 thereof.
Figure 6:
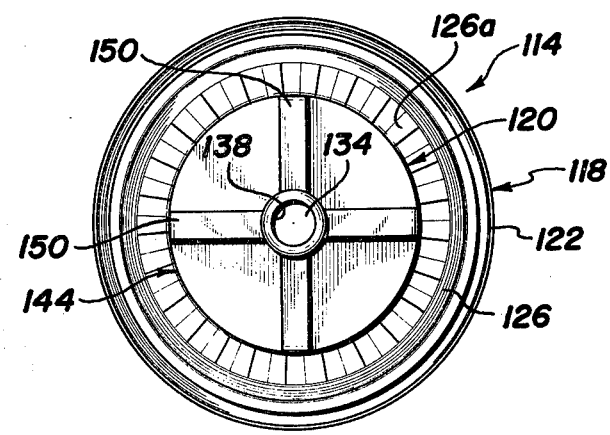
FIG. 6 is a bottom view of the mouthpiece of FIGS. 4 and 5.

Turning now to the embodiment of the invention illustrated in FIGS. 4 to 6, there is shown an alternative mouthpiece 114 which is the equivalent of mouthpiece 14 in all essential respects, features common to both embodiments being identified in FIGS. 4 to 6 by reference numerals which are one hundred numbers greater than corresponding reference numerals in FIGS. 1 to 3.

The construction shown in FIGS. 4 to 6 permits use of an extremely thin-walled receiver element 118 with consequent economy of material. To this end, the radial dimension of enlargement 144 is such that the outer diameter of annular surface 148 is greater than the overall axial length of the enlargement. Preferably, annular surface 148 is substantially coterminous with base wall 124 of receiver member 118 to provide stable support for receiver element 118.

The rigidity of lateral wall 126 may be increased by providing a portion thereof with flutes or pleats as at 126a.

The function of the stop 50 of FIGS. 2 and 3 is performed in the embodiment of FIGS. 4 to 6 by radially extending ribs 150 formed on the side of enlargement 144 opposite annular surface 148. The rib construction effects an economy of material without sacrificing the rigidity of the enlargement. Material is also saved by reducing the longitudinal dimensions of stem member 120 relative to stem member 20 of FIGS. 2 and 3. The reduced longitudinal dimension of inlet end portion 140 acts to space end wall 132 still further from the lips of the subject during use. It also reduces the depth of trap 154, a condition of little or no moment under most conditions, as explained hereinbelow.

For simplicity of manufacture, only two apertures 152 are provided in inlet end portion 140. Apertures 152 are opposed to each other and rectangular in cross section. Preferably the cross sectional area of each aperture 152 is at least as great as the cross sectional area of passage 134 to ensure that there will be no interference with the free flow of breath into and through passage 134.

To use either of the mouthpieces 14 and 114, the mouthpiece is first assembled by inserting inlet end portion 40, 140 into receiver element 18, 118 by way of opening 28, 128 until annular surface 48, 148 of enlargement 44, 144 engages outer surface 24b, 124b of base wall 24, 124. Outlet end portion 42, 142 is then inserted into inlet 16 of the breath testing device until the inlet is engaged by stop 50 or ribs 150. (It will be apparent that if desired, mouthpiece 14, 114 may be assembled after stem member 20, 120 has been connected with inlet 16.)

Rim portion 22 is placed in engagement with the face of the subject with the rim portion surrounding the lips of the subject. When the test is to be commenced, the subject is instructed to expel breath into receiver member 18, 118. The expelled breath enters receiver element 118, alters direction to enter apertures 52, 152 and is introduced to the breath testing device by way of passage 34, its outlet 38 and inlet 16 of the testing device.

When the breath alters direction to enter the apertures 52, 152, saliva and oral debris, if any, continue beyond the apertures to collect in trap 54, 154. Unless excessive amounts of saliva are expectorated or carried with the breath, the liquid will simply be deposited in droplet form on inner surface 24a, 124a of base wall 24, 124 and adjacent surfaces of lateral wall 26, 126 and inlet end portion 40, 140. Accordingly, it is unlikely that the level of liquid in the trap will rise to the apertures in the case of mouthpiece 114 and extremely unlikely in the case of mouthpiece 14.

When the test has been completed mouthpiece 14, 114 may be removed from inlet 16 and disposed of, cleaned or sterilized. Alternatively, stem member 20, 120 may be permitted to remain in place and only receiver member 18, 118 removed.

While the invention has been described in connection with certain specific embodiments thereof, it is to be understood that this is by way of illustration and not by way of limitations; and the scope of the appended claims should be construed as broadly as the prior art will permit.

What is claimed is:

1. A mouthpiece stem member for a breath testing device, comprising a tubular wall closed at one end thereof, the tubular wall being open at the other end thereof to form a breath outlet of the stem member, an enlargement provided on the tubular wall outwardly thereof and spaced from the closed end, the stem member being adapted to support a mouthpiece cup member thereon in engagement with the enlargement and in a position surrounding the closed end in spaced relation thereto, and means defining at least one aperture in the tubular wall intermediate the enlargement and the closed end, the aperture forming a breath inlet of the stem member.

2. The mouthpiece stem member according to claim 1, wherein the enlargement is located intermediate the ends of the tubular wall.

3. The mouthpiece stem member according to claim 1, wherein the enlargement provides an annular surface extending outwardly of the tubular wall and facing toward the closed end thereof, the annular surface lying in a plane normal to the axis of the tubular wall.

4. The mouthpiece stem member according to claim 3, wherein the outer diameter of the annular surface is greater than the axial length of the enlargement.

5. The mouthpiece stem member according to claim 1, wherein the aperture is adjacent the closed end of the tubular member.

6. A mouthpiece for a breath testing device comprising: an elongated hollow element having a first end portion terminating in a closed end, and a second end portion terminating in an open end, the hollow element thereby defining a passage having a blind end and an outlet, the first end portion being provided with aperture means proximate the closed end and communicating with the passage, the second end portion being adapted for connection to a breath testing device with the outlet of the passage in communication with an inlet of the testing device; and a receiver element carried by the hollow element at a position intermediate the end portions and comprising a wall portion surrounding and extending outwardly from the hollow element and in the direction of the closed end to surround the closed end in spaced relation thereto, the wall portion terminating beyond the closed end in a rim portion formed to surround the lips of a subject to be tested, with the rim portion in engagement with the face of the subject, whereby, when the rim portion is so engaged, breath expelled by the subject will enter the receiver element, alter direction to enter the passage by way of the aperture means, and exit from the outlet of the passage.

7. The mouthpiece according to claim 6, wherein the first end portion and the wall portion are so dimensioned that the closed end is spaced inwardly of the receiver element from the rim portion a distance sufficient to discourage engagement of the first end portion by the lips and teeth of the subject, whereby to maintain the aperture means unobstructed.

8. The mouthpiece according to claim 6, wherein the aperture means is adjacent the closed end of the hollow element, and the wall portion and the first end portion cooperate to provide a moisture trap, the first end portion being so dimensioned that the aperture means is spaced from the moisture trap.

9. A mouthpiece for a breath testing device, comprising a cup element having a base wall and a lateral wall extending from the base wall, the lateral wall terminating in a rim portion formed to surround the lips of a subject to be tested, with the rim portion in engagement with the face of the subject, an outlet element extending outwardly of the cup element from the base wall and adapted for connection to an inlet of a breath testing device; a pedestal element extending inwardly of the cup element from the base wall and surrounded by the lateral wall in spaced relation thereto, the outlet element and the pedestal element being aligned with each other and cooperating to define a passage extending through the base wall, the outlet element being open at the end thereof opposite the base wall to form an outlet of the mouthpiece, the pedestal element being closed at the end thereof opposite the base wall, and means defining at least one aperture in the pedestal element adjacent the closed end thereof to form an inlet communicating with the passage, the closed end of the pedestal element being spaced inwardly of the cup element from the rim portion, whereby when the rim portion is engaged with the face of the subject and surrounding the lips thereof, breath expelled by the subject will enter the cup element, alter direction to enter the passage by way of the aperture, and exit from the outlet.

10. The mouthpiece according to claim 9, wherein the pedestal element and the lateral wall are so dimensioned that the closed end is spaced inwardly of the cup element from the rim portion a distance sufficient to discourage engagement of the pedestal element by the lips and teeth of the subject, whereby to maintain the aperture means unobstructed.

11. The mouthpiece according to claim 9, wherein the lateral wall, the base wall and the pedestal element cooperate to provide a moisture trap, the aperture being spaced from the moisture trap.

12. A mouthpiece for a breath testing device, comprising: a receiver member and a stem member, the receiver member having a base wall having an outer surface and an inner surface and defining an opening centrally thereof, and a lateral wall extending out of the base wall at the inner surface thereof, the lateral wall terminating in a rim portion adapted to surround the lips of a subject to be tested, with the rim portion in engagement with the face of the subject; the stem member comprising an elongated wall having an inner surface defining a passage and an outer surface, the elongated wall having a first end portion terminating in a closed end, a second end portion terminating in an open end to form an outlet of the passage, the first end portion being provided with aperture means proximate the closed end and communicating with the passage to form an inlet thereof, the second end portion being adapted for connection to a breath testing device with the outlet of the passage in communication with an inlet of the testing device, and a central section comprising an outer enlargement of the wall and providing a shoulder extending outwardly relative to the first end portion and adjacent thereto, the outer surface of the elongated wall at the first end portion thereof being complementary to the opening defined by the base wall, whereby the first end portion is receivable in the opening to mount the receiver member on the stem member with the outer surface of the base wall in engagement with the shoulder, with the base wall surrounding the first end portion in close engagement therewith, and with the lateral wall of the receiver element surrounding the first end portion in spaced relation therewith, the lateral wall and the first end portion being so dimensioned that the closed end of the first end portion is spaced from and intermediate the base wall of the receiver member and the rim portion thereof when the receiver member is mounted on the stem member.

13. The mouthpiece according to claim 12, wherein the lateral wall of the receiver member and the first end portion of the stem member are so dimensioned that the closed end is spaced from the rim portion a distance sufficient to discourage engagement of the first end portion by the lips and teeth of the subject when the receiver member is mounted on the stem member and the rim portion is engaged with the face of the subject, whereby to maintain the aperture means unobstructed.

14. The mouthpiece according to claim 12, wherein the shoulder of the stem member and the base wall of the receiver member substantially are coterminous when the receiver member is mounted on the stem member.

15. The mouthpiece according to claim 12, wherein the aperture means is adjacent the closed end of the first end portion.

16. The mouthpiece according to claim 12, wherein the lateral wall and the base wall of the receiver member and the first end portion of the stem member cooperate to provide a moisture trap when the receiver member is mounted on the stem member, the aperture means being spaced from the moisture trap.

* * * * *